Patented May 12, 1931

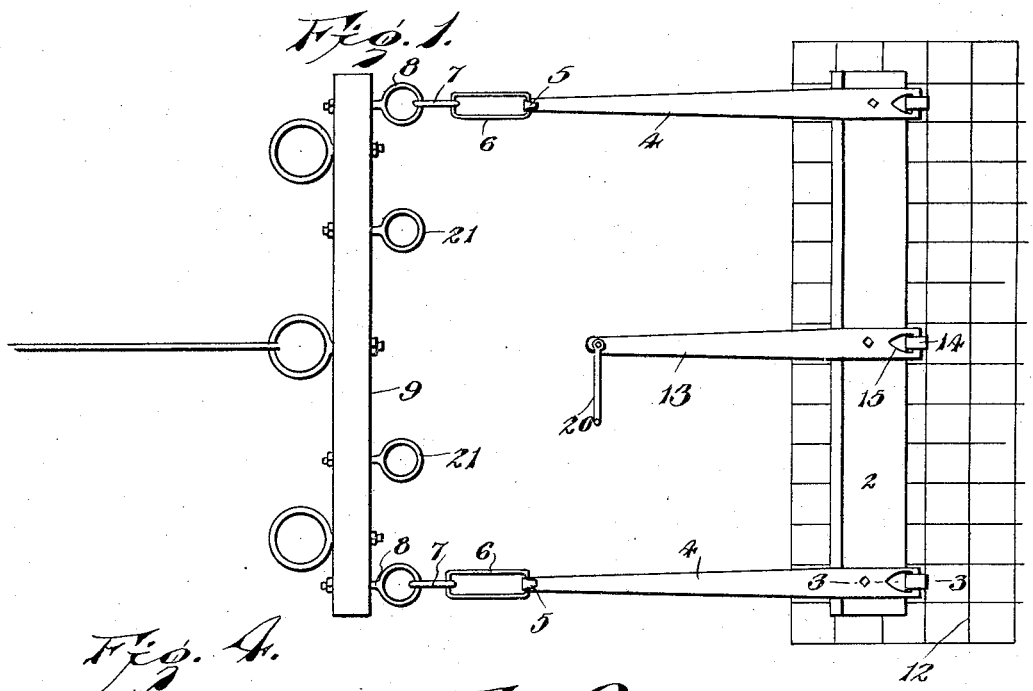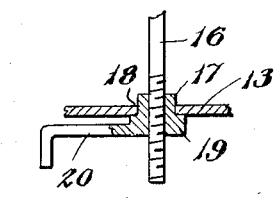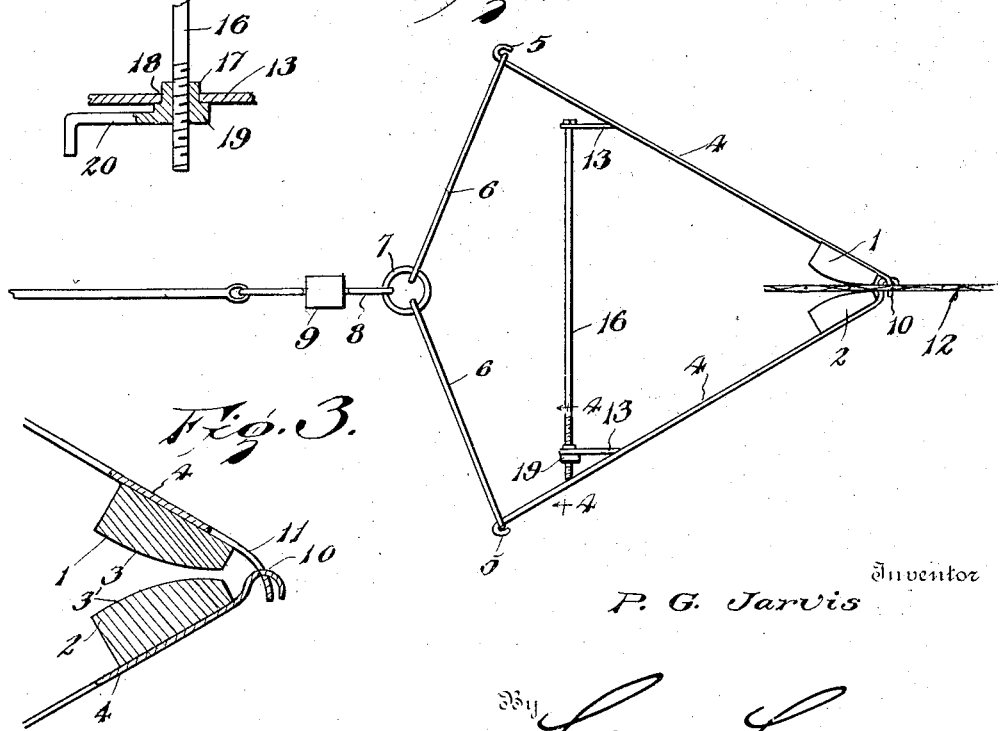

1,804,502

UNITED STATES PATENT OFFICE

PERRY G. JARVIS, OF MINNORA, WEST VIRGINIA

WIRE STRETCHER

Application filed June 5, 1928. Serial No. 283,023.

The present invention is directed to improvements in wire stretchers.

The primary object of the invention is to provide a device of this character designed primarily for stretching woven wire, the construction being such that the wire can be placed under a great tension and secured to the post.

Another object of the invention is to provide a device of this character so constructed that it can be easily and quickly attached to the woven wire fabric in order that the same can be properly stretched.

Another object of the invention is to provide a device of this character which is exceedingly simple in construction, durable, efficient in operation, and one which can be manufactured at a very small cost.

With these and other objects in view, this invention resides in the novel feature of construction, formation, combination and arrangement of parts to be hereinafter more fully described, claimed and illustrated in the accompanying drawing, in which:—

Figure 1 is a side elevation of the device.

Figure 2 is a top plan view.

Figure 3 is a sectional view on line 3—3 of Figure 1.

Figure 4 is a sectional view on line 4—4 of Figure 2.

Referring to the drawing, 1 and 2 designate the jaws having curved gripping faces 3 and 3', respectively. The jaws may be formed from any suitable material.

Each jaw has fixed thereto and near the ends thereof in any approved manner upper and lower arms 4, the outer ends thereof having hooks 5 which are engaged by the outer ends of the links 6, the inner ends of said links being connected to rings 7, which in turn are interlocked with eye bolts 8 secured near the ends of the draw bar 9.

One of the arms 4 has its outer end provided with a hook 10 adapted to detachably engage the slot 11 of the companion arm so that the jaws will be pivotally connected to move toward each other when strain is applied to the draw bar 9, thus causing the jaws 1 and 2 to firmly grip the woven wire fabric 12 to be stretched.

To firmly clamp the jaws in engagement with the fabric 12, a pair of bars 13 are provided and have their outer ends bolted to the respective jaws 1 and 2, one of said bars having its outer end provided with a hook 14 for detachably engaging the slot 15 of the companion bar. The bars 13 lie in the same vertical plane as the arms 4 except that their ends are bent inwardly toward each other, as shown in Fig. 2, to accommodate a clamping rod 16 conveniently.

The clamping rod 16 has one end engaged in one of the bars 13 and the other end is threaded in a collar 17 which is rotatable in a bearing 18 of the other bar. This collar has a head 19 carried thereby and is provided with an operating crank handle 20 to facilitate the rotation of the collar in order that the rod may be advanced through said collar to draw the bars 13 toward each other to compel the jaws 1 and 2 to firmly grip the fabric 12.

The draw bar 9 may be connected to a cant hook or other device for exerting strain thereon to perform the stretching operation.

The jaws 1 and 2 may be made in various lengths, and to accommodate shorter jaws the draw bar 9 is provided with additional eye bolts 21 to cooperate with the arms carried by such jaws.

To use the device, the jaws are placed upon the opposite sides of the fabric 12 with the respective hooks and slots interlocked, after which the head 19 is rotated to move the bars 13 toward each other to cause the gripping jaws 3 and 3' to firmly grip the fabric, whereupon the hooks of the arms 4 are engaged in the links 6 and strain applied to the draw bar 9, thus effectively stretching the fabric for securement to the post, or other supports.

It will be apparent that a wire stretcher has been provided which can be easily and quickly attached to or removed from the fabric, the construction being such that equal strain will be applied to the fabric during the stretching operation.

From the foregoing, it is thought that the construction, operation and advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

A wire stretcher comprising clamping jaws, upper, lower and intermediate pairs of horizontally extending bars fixed to the jaws, one bar of each pair of bars terminating in a hook and the other bar terminating in an eye engaging said hook whereby said jaws are pivotally connected together, the bars of each pair of bars diverging outwardly from said jaws, a crank handle having a collar journaled in a bearing formed in the free end of one of the bars of said intermediate pair of bars, a clamping rod secured terminally to the other bar of said intermediate pair of bars and having the free end threaded into said collar, rotation of said handle advancing said rod through said collar to clamp said jaws together, and means on the free ends of the upper and lower pairs of bars for exerting strain thereon to perform the stretching operation.

In testimony whereof I affix my signature.

PERRY G. JARVIS. [L. S.]